United States Patent
Gustavsson et al.

(10) Patent No.: US 6,438,120 B1
(45) Date of Patent: Aug. 20, 2002

(54) METHOD IN A TELECOMMUNICATION SYSTEM

(75) Inventors: Pär Gustavsson, Linköping; Thomas Johansson, Solna, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/568,808

(22) Filed: May 11, 2000

(30) Foreign Application Priority Data

May 12, 1999 (SE) .............................. 9901769

(51) Int. Cl.⁷ .............................................. H04B 7/216
(52) U.S. Cl. ........................................ 370/335; 370/342
(58) Field of Search .................. 370/310, 320, 370/328, 331, 335, 338, 342, 393, 441, 479, 233; 342/375; 455/522; 375/140, 130

(56) References Cited

U.S. PATENT DOCUMENTS

| 5,297,161 | A | | 3/1994 | Ling |
| 5,345,469 | A | | 9/1994 | Fulghum |
| 5,646,632 | A | * | 7/1997 | Khan et al. ................. 342/375 |
| 5,790,534 | A | * | 8/1998 | Kakkoo et al. .............. 370/335 |
| 6,009,086 | A | * | 12/1999 | Freeburg et al. ............ 370/331 |
| 6,085,107 | A | * | 7/2000 | Persson et al. ............. 455/522 |
| 6,097,700 | A | * | 8/2000 | Thornberg et al. .......... 370/233 |
| 6,163,548 | A | * | 12/2000 | Rainish et al. .............. 370/479 |

FOREIGN PATENT DOCUMENTS

EP 037817 7/1990

* cited by examiner

Primary Examiner—Melvin Marcelo
Assistant Examiner—Inder Pal Mehra
(74) Attorney, Agent, or Firm—Burns, Doane, Swecker & Mathis, L.L.P.

(57) ABSTRACT

The present invention relates to a method for co-ordination of uplink scrambling codes between different radio network controllers (21) and the assignment of such codes to radio connections (27) of user equipments (26) in a code division multiple access (CDMA) communication system. The invention also relates to methods for creating a starting vector used to generate said scrambling codes. According to the invention, a unique subset of scrambling codes is dedicated to each radio network controller (21) by assigning an offset vector (212). Initial starting vectors (215) are composed by concatenating the offset vector (212) and the binary representation of a determining value (216) within the size range of the dedicated code subset. An idle starting vector is selected, e.g., by using a one-dimensional array (217) containing a status bit for each scrambling code and by using the array index (213) as determining value (216).

12 Claims, 6 Drawing Sheets ns in that user's communication.

METHOD IN A TELECOMMUNICATION SYSTEM

This application claims priority under 35 U.S.C. §§119 and/or 365 to 9901769-1 filed in Sweden on May 12, 1999; the entire content of which is hereby incorporated by reference.

FIELD OF THE INVENTION

The present invention relates generally to telecommunication systems, more particularly to the co-ordination of uplink scrambling codes between different radio network controllers (RNC) and the assignment of such codes to radio connections of user equipment in a code division multiple access (CDMA) communication system. The invention also relates to methods for creating a starting vector used to generate said scrambling codes.

BACKGROUND OF THE INVENTION

There are several approaches to methods for sharing a common communication medium amongst a plurality of users. These approaches base on the principle to provide each single user with a communication connection having a certain characteristic that makes a user distinguishable from other users sharing simultaneously the same communication medium. When using frequency division multiple access (FDMA), e.g., each user can be distinguished by a distinct frequency band that is permanently assigned to that user for sending and receiving. The users are able to send whenever they want; however, only within a narrow carrier frequency band. When using time division multiple access (TDMA), each user can be distinguished by distinct time slots that are periodically assigned to that user for sending and receiving. The users are able to send and receive using the entire available bandwidth; however, only at certain short periods of time.

In contrast to that, in a code division multiple access (CDMA) communication system a distinction of different users of the shared communication medium is made by applying a plurality of code sequences to the user signals. Thus, user communication signals from a plurality of user equipment (UE) can be transmitted at the same time and using the entire available carrier frequency bandwidth. These systems intend to achieve a band spreading with sufficient bandwidth expansion in order to give so large suppression of interference from radio connections marked with another code that enough isolation is obtained between simultaneous connections and, thus, to permit multiple access.

However, said code sequences must fulfil certain conditions: For identification of a specific user in a communication system, a large number of code sequences is necessary in order to be able to assign each user a unique code sequence. Suitable code sequences must on the one hand comprise good autocorrelation properties for a reliable initial synchronisation and separation of multipath components and on the other hand a sufficiently low cross-correlation in order to suppress interference in a multiple user system.

One common type of code sequences applied for the uplink radio connection between a user equipment (UE) and a radio base station (RBS) are so called pseudo-noise (pn) sequences, which are generated by help of feedback shift registers. Examples for suitable sequences are maximum-length sequences, Gold- or Gold-like codes, or Kasami-codes.

In a direct-sequence (DS) spread spectrum system, the output signal from a normal transmitter is modulated with a local oscillator comprising an uplink scrambling code sequence. In the receiver, signals from all the communication of various users are received and a specific one is selected by assigning the specific code sequence for that user to a correlator to extract the signal energy intended for that receiver, thereby despreading the received CDMA transmission. By that, the desired signal being marked with a certain code sequence can be detected even against a background of strong interference. All other uncorrelated user transmissions appear as noise.

From what has been said above, it becomes apparent that in a proper working system it is important to provide unique code sequences to each user equipment having a communication connection within a certain area in order to be able to detect said user communication and to prohibit crosstalk between different communication connections. In a known solution, which is applied, inter alia, in IS-95, a standardised identity of a mobile station, e.g. its serial number, is used to create an uplink scrambling code that is unique for that particular mobile station. An identity that is not sufficiently long could be extended, e.g., by padding zeros.

SUMMARY OF THE INVENTION

It is an object of this invention to provide a method for co-ordination of uplink scrambling codes that are assigned to radio connections between a user equipment (UE) and its serving radio base station (RBS) in a CDMA-based communication system.

It is another object of the present invention to provide an efficient and secure method for assignment of unique uplink scrambling codes.

Yet another object of the present invention is to provide a decentralised but still co-ordinated and network controlled assignment method.

Yet another object of the present invention is to provide an alternative assignment method without need for deallocation of an assigned code after the corresponding connection has been terminated.

Still another object of the present invention is a method to create starting vectors that can be used for the generation of uplink scrambling codes.

Briefly, these and other objects of the present invention are accomplished by dedicating a unique subset of scrambling codes to each radio network controller (RNC) in a network. In particular, each RNC is assigned an offset vector representing a first vector of a continuous succession of initial starting vectors. A unique subset of initial starting vectors is formed by concatenating said offset vector and the binary representation of a determining value within the size range of the dedicated code subset. An idle starting vector is selected either by using a one-dimensional array containing a status bit for each scrambling code and using the array index as determining value or, alternatively, by using a cyclical or random assignment method. A code generating unit can, by help of a selected initial starting vector, generate the scrambling code from an appropriate code family.

As a first advantage, the present invention comprises a method for co-ordination and assignment of unique uplink scrambling codes to the radio connections between an user equipment (UE) and a radio base station (RBS) in a CDMA-based communication system.

As another advantage of the present invention, the decentralised assignment method within the radio network improves system maintenance and security in case of unexpected disturbances.

Yet another advantage of the present invention is an increased flexibility and, at the same time, a reduced complexity in the system components achieved by distributing the functionality for generating and managing of uplink scrambling codes.

Yet another advantage of the present invention is a decreased signalling traffic due to the decentralised assignment method within the radio network.

Other objects, advantages and novel features of the invention will become apparent from the following detailed description of the invention when considered in conjunction with the accompanying drawings and claims.

BRIEF DESCRIPTION OF THE DRAWINGS

For a better understanding, reference is made to the following drawings and preferred embodiments of the invention.

DETAILED DESCRIPTION

Figure 1:
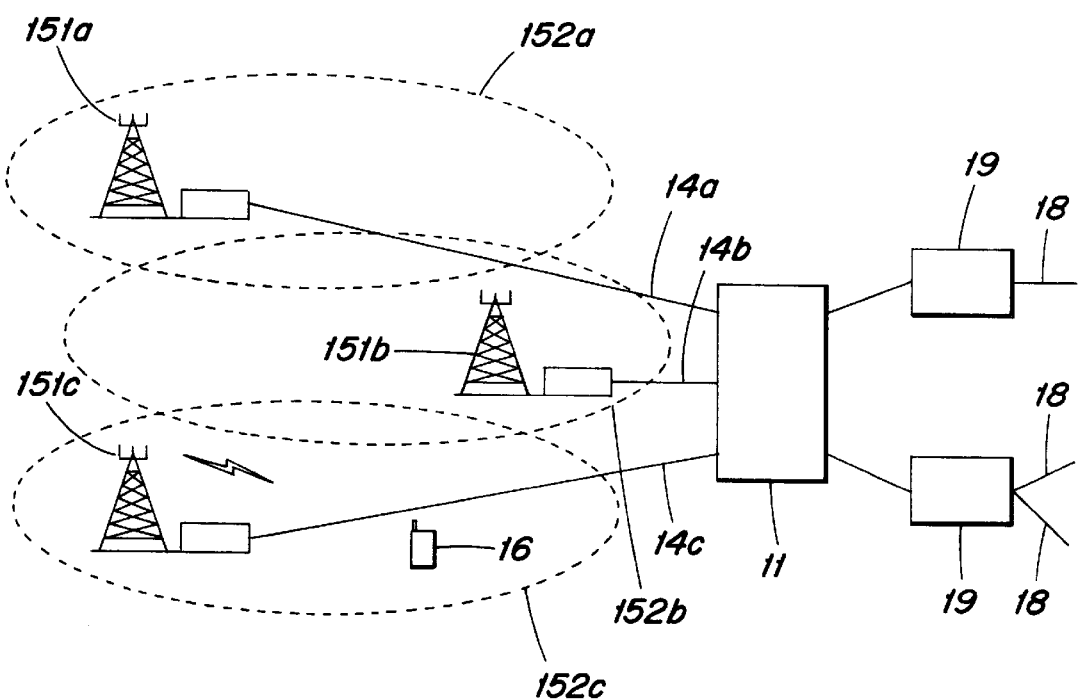
FIG. 1 shows an overview of a CDMA-based communication system.

FIG. 1 shows an overview of a CDMA-based communication system. A radio network controller (RNC) 11 holds a central position in the radio network and houses network control functions such as connection establishment and release, hand-over, power control, and radio resource handling functions. Connections 14a, 14b, 14c are provided between said RNC 11 and a plurality of radio base stations (RBS) 151a, 151b, 151c, each covering a certain area 152a, 152b, 152c and handling communication connections to and from a user equipment 16 located within said area. Also interconnection links 18 are provided between said RNC and other networks, e.g. via mobile services switching centres 19.

The present invention relates to CDMA-based communication systems and more specific to a reliable and easy method for co-ordination and assignment of an uplink scrambling code to the radio connection between a user equipment (UE) and its serving radio base station (RBS). The applied assignment method is sufficiently easy while still providing a reliable system. In this context, an easy assignment method implies that the applied algorithms require a minimum of system capacity and input data for efficient code management. A reliable system implies that each scrambling code is assigned to at most one user equipment at the same time.

A first concept of the present invention is to dedicate a certain subset of scrambling codes from the total set of available long scrambling codes to each radio network controller (RNC) in a network. These dedicated subsets shall be unique for each radio network controller. Yet another concept of the present invention is that each radio network controller (RNC) is solely responsible for code maintenance and code assignment to a user equipment within its operation area. The present invention focuses mainly on the RNC as responsible for code subset handling. However, the methods according to the invention could also be performed by another equivalent unit in the network.

Figure 2:
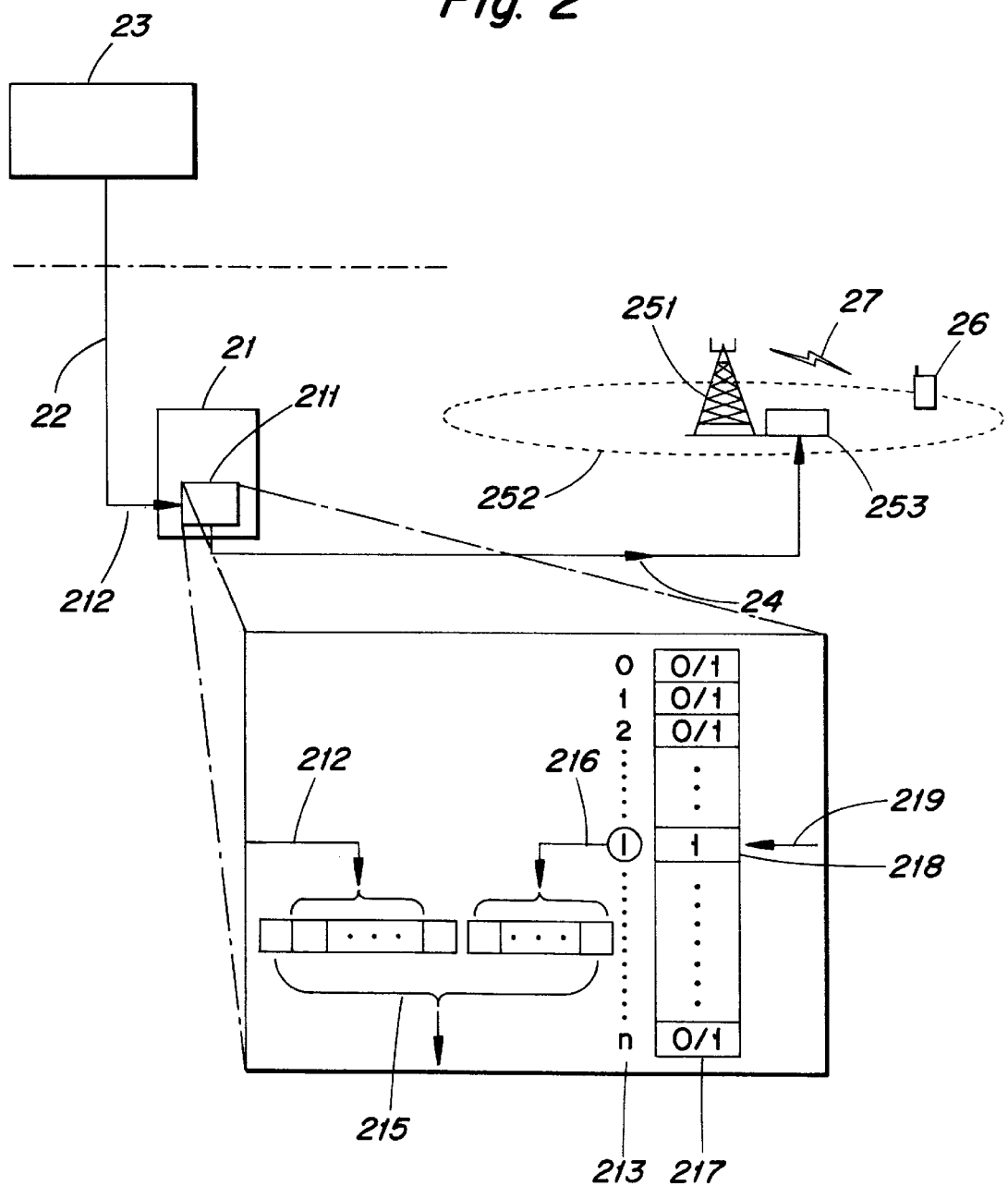
FIG. 2 illustrates the concept for co-ordination and assignment of a code subset dedicated to a radio network controller using the preferred embodiment of the method according to the present invention.

FIG. 2 shows an overview of a part of a CDMA-based communication system applying the method according to the present invention. At an initial start, the radio network controller (RNC) 21 establishes a connection 22 to a code subset server 23, which is located, e.g., in the O&M (Operation & Maintenance) network or in the core network, and requests for a code subset from said server. In response to that, a unique subset of scrambling codes is dedicated to the requesting RNC 21. The code subset server 23 keeps track of which code subsets already have been assigned to other radio network controllers and which code subsets are idle. Therefore, it is secured that the dedicated code subset is unique for a specific RNC. Considering a set of long scrambling codes with a total amount of $2^{41}$ codes, the set can be divided into, e.g., $2^{25}$ code subsets each containing roughly $2^{16}$ codes when disregarding a minor number of common channel codes. However, the actual number of codes in a subset may vary for each RNC depending on its needs. If necessary, it is possible either to dedicate an additional code subset to an RNC or to remove a part of its code subset. Thus, it is possible to adjust the amount of allocated scrambling codes to the actual traffic situation.

In order to facilitate the assignment of codes, in the preferred embodiment of the invention, a code handling unit 211 in the RNC 21 does not receive and store a subset of plain code sequences from the code subset server 23. Instead, by means of the established connection 22 to the code subset server 23, an offset vector 212, which is specific for an RNC, is assigned to the RNC 21 from said code subset server 23. This offset vector 212 represents a first vector of a continuous succession of vectors. From this, an initial starting vector 215 of said succession is composed by concatenating the binary representation of said assigned offset vector 212 and the binary representation of a determining value 216 within the size range [0,n] of the code subset. Correspondingly, the decimal equivalent of said initial starting vector 215 could be obtained by adding the decimal value of said offset vector 212 and said determining value 216. This implies that the offset vector 212 constitutes a common left side for all initial starting vectors 215 that are applied by said RNC 21. The decimal equivalent of an initial starting vector is forwarded and applied to generate the code sequences.

As already mentioned above, each RNC 21 is responsible to keep track of its dedicated scrambling code subset, e.g. idle codes or occupied codes that have been assigned to user equipments. Therefore, an additional aspect of the present invention relates to maintaining and efficiently using the code subset that has been assigned to the RNC. It is of special importance to secure that a certain scrambling code is assigned only to one user equipment at a time. According to the invention, two alternatives are suggested for code assignment from the subset of an RNC to a user equipment. These alternatives are presented in FIGS. 2,3 and 4,5 respectively.

As illustrated in FIG. 2, when using the preferred method according to the invention, the code subset handling within the code handling unit 211 of the radio network controller 21 is managed using a one-dimensional array 217 having an array length corresponding to the size of the dedicated code subset. Each array element 218 represents an initial starting vector of the code subset that has been assigned to said radio network controller 21. The first element of the array represents the first code in the code subset and the last element of the array represents the last code in the subset. An initial starting vector 215 is composed as described above by concatenating the binary representation of the offset vector 212 and the binary representation of an array index 213. Correspondingly, the decimal equivalent of said initial starting vector 215 could be obtained by adding the decimal value of said offset vector 212 and said array index 213. The contents of an array element 218 indicates the status of the uplink scrambling code that would be generated by the initial starting vector corresponding to the array index 216 of that element. Coding could be made such as a '0' representing the busy-state, i.e. a code sequence that has already been assigned to a mobile station, and '1' representing the idle-state, i.e. a momentarily idle code sequence. The decimal equivalent of the initial starting vector is forwarded by means of a connection 24 to a code sequence generator 253 located, e.g., in the radio base station (RBS) 251 and used to generate the uplink scrambling code that is to be assigned to the radio connection 27 of a user equipment 26 within the coverage area 252 of said radio base station 251.

Figure 3:
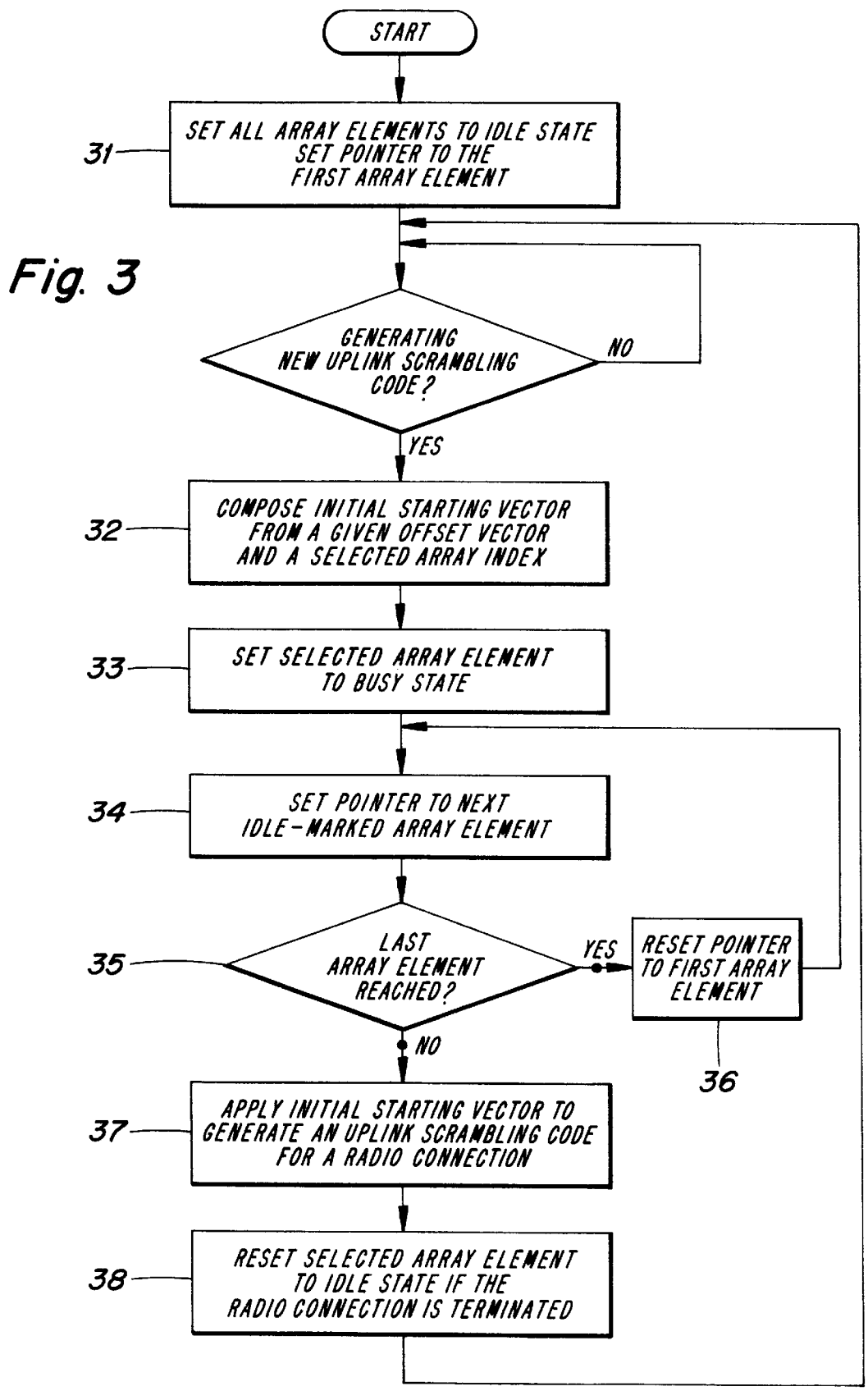
FIG. 3 shows a flowchart of the preferred embodiment of the method according to the invention.

According to the preferred embodiment of the method of the invention, the assignment of an idle uplink scrambling code to a user equipment is done using the algorithm as presented in the flowchart shown in FIG. 3: Initially, block 31, all elements of the array are set to the idle state, e.g. '1', and a pointer is set to an idle-marked array element, e.g. the first element in said array. Then block 32, if a new uplink scrambling code shall be generated, an initial starting vector is composed using the offset vector and the array index of the array element that is actually marked by the pointer. Next, block 33, the selected array element is set to a busy-state, e.g. '0', and the pointer is set, block 34, to the next idle marked array element. If said pointer has reached the last array element, as indicated in block 35, it is reset to the beginning of the array, block 36, and from there to the next idle-marked array element. Alternatively, the array could always been searched top-down to retrieve an idle starting vector. The initial starting vector is applied, block 37, by a code generating unit to generate the uplink scrambling code that is assigned to a radio connection. When said radio connection is terminated, block 38, the uplink scrambling code is deallocated by resetting the array element of which the index was used to compose the initial starting vector.

Figure 4:
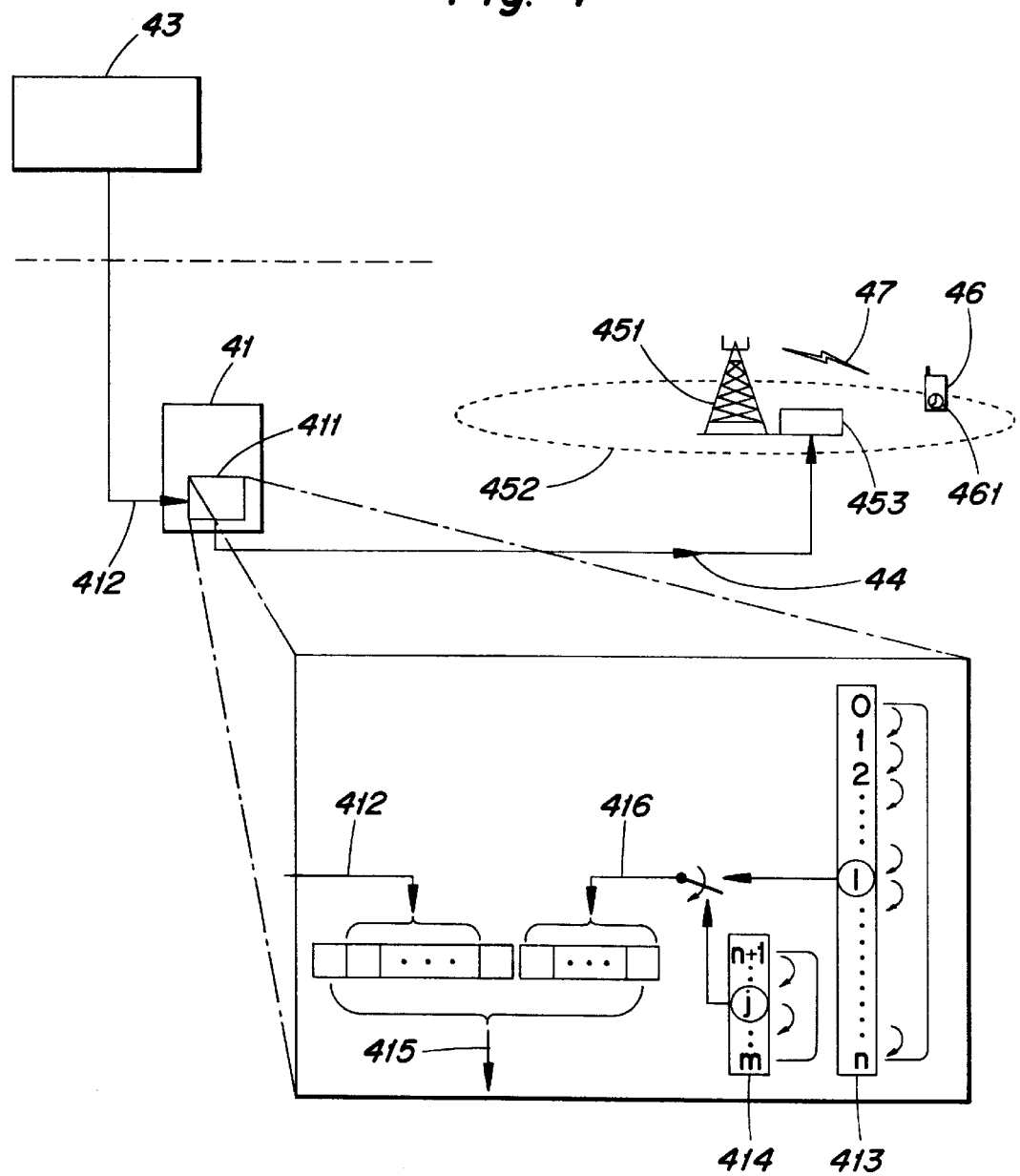
FIG. 4 illustrates the concept for co-ordination and assignment of a code subset dedicated to a radio network controller using an alternative embodiment of the method according to the present invention.

FIG. 4 illustrates another embodiment using an alternative method according to the invention. The radio network controller (RNC) 41 requests a subset of dedicated scrambling codes from a code subset server 43 and is assigned an offset vector 412. In a code subset handling unit 411, the initial starting vectors 415 are composed by cyclically selecting determining values 416 within the size range of the dedicated code subset and concatenating the binary representation of the assigned offset vector 412 and the binary representation of said selected determining values 416. The decimal equivalent of said initial starting vector is forwarded by means of a connection 44 to a code sequence generator 453 located, e.g., in the radio base station (RBS) 451 and used to generate the uplink scrambling code that is assigned to the radio connection 47 of a user equipment 46 within the coverage area 452 of said radio base station 451.

When using this assignment method, there is no need to implement a status array for control of the dedicated scrambling codes. With respect to the code management, the signalling traffic within the RNC 41 is reduced because an assigned code need not to be deallocated when the corresponding radio connection 47 of a user equipment 46 is released.

However, as the same uplink scrambling code must not be assigned twice, it is obvious that the maximum allocation time of a code must be substantially shorter than the cycle time within which all codes of the entire subset have been assigned once when assuming average allocation density and connection time. This cycle time and, accordingly, the maximum allowable allocation time depends on, inter alia, the allocation density from the subset of dedicated scrambling codes and the size of said code subset. Therefore, when using said cyclical assignment method, a time supervision 461 is necessary indicating at which moment at the latest an assigned scrambling code must be deallocated to avoid a that the code is assigned twice. Said time supervision 461 can be implemented, e.g., in the user equipment 46. In order to be able to handle communication connections regardless of their duration, the value range for the determining values is divided into two subranges: A major range 413 extending over the interval [0,n] and containing n+1 values is intended for composing initial starting vectors that generate scrambling codes for ordinary connections. A minor range 414 extending over the interval [n+1,m] and containing m−n values (m>n) is intended for composing initial starting vectors that generate scrambling codes for connections with long durations. The size of said minor range must be adjusted to the estimated number of calls per time unit having a connection time that exceeds the maximum allowable allocation time. This is, in general, a low number.

Figure 5:
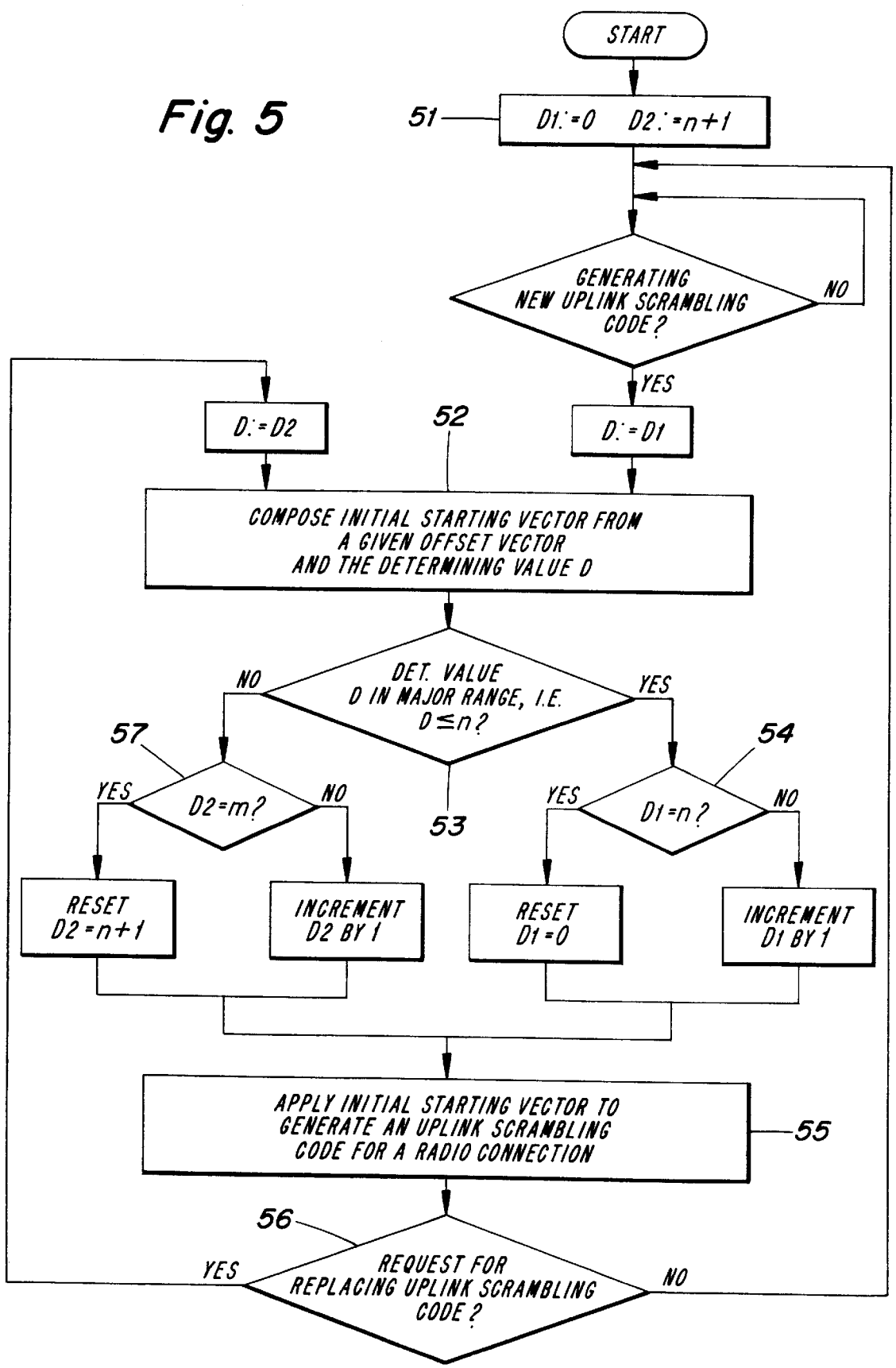
FIG. 5 shows a flowchart of the alternative embodiment of the method according to the invention.

According to the alternative embodiment of the method of the invention, the assignment of an idle uplink scrambling code to a user equipment is done using the algorithm as presented in the flowchart shown in FIG. 5: Initially block 51, the determining values $D_1$ for the major range and $D_2$ for the minor range are set to a starting value, e.g. $D_1=0$, $D_2=n+1$. Then, block 52, if an uplink scrambling code for a new communication connection shall be generated, an initial starting vector is composed using the offset vector and the binary representation of the determining value $D_1$ from the major range. As the determining value $D_1$ is within the major range, block 53, $D_1$ is incremented by one as long as it remains within the size range of the major range, or reset to the starting value, as shown in block 54. Next, block 55, the initial starting vector is applied by a code generating unit to generate the uplink scrambling code that is assigned to a radio connection. For a user equipment that is connected for a considerable long time, a new uplink scrambling code is requested, block 56, when the allowed maximum allocation time of the assigned code has expired. In this case, the replacing code is generated, block 52, by using a determining value $D_2$ from the minor range. As the determining value $D_2$ is within the minor range, block 53, $D_2$ is incremented by one as long as it remains within the size range of the minor range, or reset to the starting value, as shown in block 57. Alternatively, in order to avoid a division into two code subsets, the replacing scrambling code could also be generated from the next determining value of the major range when applying the cyclical assignment algorithm.

Still another possible embodiment of a method for assignment of scrambling codes relates to a random assignment of codes to a user equipment. However, this requires a large number of available codes and implies a certain probability that two user equipments located in the same area are assigned the same uplink scrambling code. A scrambling code intended for a certain user equipment is randomly selected either from the dedicated subset of the RNC to which said user equipment belongs or centrally, i.e. without a division into RNC specific code subsets, from the total amount of available scrambling codes.

Figure 6:
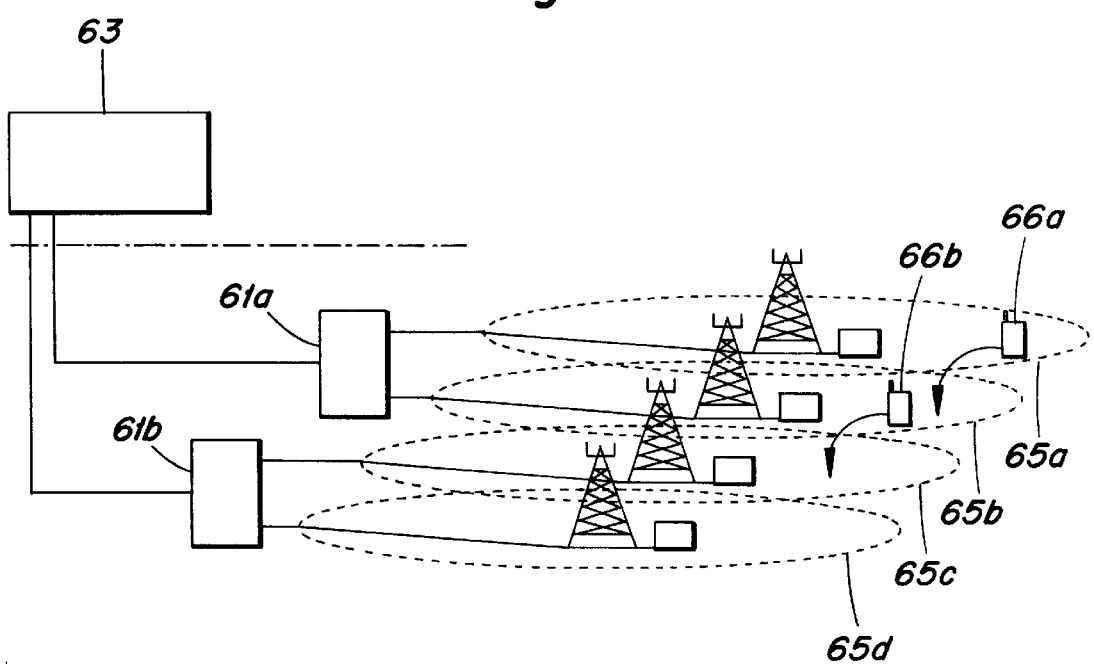
FIG. 6 shows an overview of a radio based communication system including a plurality of base stations connected to different radio network controllers.

An additional aspect concerning the method for co-ordination and assignment according to the invention is related to situations when a user equipment moves around between cells that are served by different radio network controllers. FIG. 6 illustrates an overview of a communication system comprising a plurality of base station coverage areas 65a, 65b, 65c, 65d which are connected to different radio network controllers 61a, 61b. The dedication of scrambling code subsets is managed by a code subset server 63 in, e.g., the core network as described above.

From the perspective of a user equipment 66a, a radio network controller 61a acts as its serving RNC as long as the user equipment moves around within a base station coverage area 65a, 65b that is served by this RNC 61a because this RNC is responsible for all call related signalling to the core network node and, in particular, for the assignment of scrambling codes to the user equipment 66a.

When considering a first traffic case, a user equipment 66a with an ongoing communication moving from a first RBS area 65a to a second RBS area 65b is not affected to a change of its momentarily assigned uplink scrambling code as long as both radio base stations 65a, 65b are controlled by the same radio network controller 61a acting as the serving RNC for both RBS areas.

However, considering a second traffic case, if a user equipment 66b with an ongoing communication moves from a first base station area 65b controlled by a first RNC 61a to a second base station area 65c controlled by another RNC 61b, the uplink scrambling code that has been assigned by said first RNC 61a must be changed because the presently used code is exclusively managed by said first RNC 61a. When the user equipment has entered a new RNC area and a hand-over procedure has been performed, the actual serving RNC node 61a is informed of the new position of the roaming user equipment 66b. Then, the user context containing user-and connection-related information is transferred from the previous RNC 61a to the new serving RNC 61b. Now, this new RNC 61b can assign a new uplink scrambling code from its own subset to the roaming user equipment 66b while the previous RNC releases the old scrambling code.

What is claimed is:

1. A method for assigning a unique scrambling code sequence to user equipment within the coverage area of one of a plurality of radio base station in a CDMA-based communication system, in which each radio base station is communicating with one of a plurality of radio network controllers, comprising dedicating a unique subset of scrambling code sequences to each code handling unit, determining the scrambling code sequence from the subset and assigning the scrambling code sequence to the radio connection of the user equipment within the coverage area of a radio base station connected to the radio network controller, dedicating said subset by assigning an offset vector as the first vector of a continuous succession of initial starting vectors that are used to generate the scrambling code sequences of said subset, and determining a scrambling code sequence by determining an initial starting vector that is used to generate said scrambling code sequence.

2. Method according to claim 1, characterised in composing an initial starting vector that is concatenated of the binary representation of said offset vector and the binary representation of a determining value within the size range of said subset.

3. Method according to claim 2, characterised in determining an initial starting vector by means of a one-dimensional array, whereof each array index constitutes the determining value for an initial starting vector and the corresponding array element indicates the status of the scrambling code sequence that is generated by said initial starting vector.

4. Method according to claim 3, characterised in setting a pointer to the next idle-marked array element when having assigned an initial starting vector.

5. Method according to claim 2, characterised in determining initial starting vectors for generating scrambling code sequences of said subset by cyclically selecting determining values from a first range of values, defining a maximum allocating time for scrambling code sequences that have been generated by initial starting vectors using determining values from said first range of values.

6. Method according to claim 5, characterised in determining, if said maximum allocating time has expired, a new initial starting vector by selecting from said first range of value the next determining value according to the cycle.

7. Method according to claim 5, characterised in determining, if said maximum allocation time has expired, a new initial starting vector by means of selecting a determining value from a second range of values.

8. Method according to claim 5, characterised in controlling the allocating time of a scrambling code sequence that has been assigned to a user equipment using time supervision means implemented in said user equipment.

9. Method according to claim 1, characterised in transmitting a selected initial starting vector to a code generating unit.

10. Method for creating a starting vector used to generate a code sequence, characterised in selecting, by means of a one-dimensional array (217), as a determining value (216) the array index (213) of an idle-marked array element (218), concatenating the binary representation of an assigned offset vector (215) and the binary representation of said determining value (216).

11. Method for creating a starting vector used to generate a code sequence, characterised in cyclically selecting a determining value (416) from a range (413) of successive values, concatenating the binary representation of an assigned offset vector (415) and the binary representation of said determining value (416).

12. Method according to claim 1, characterised in determining an initial starting vector by randomly selecting said initial starting vector.

* * * * *